(12) United States Patent
Ma

(10) Patent No.: US 9,540,840 B2
(45) Date of Patent: Jan. 10, 2017

(54) SHAPE RETAINING FOLDABLE UMBRELLA BASE

(71) Applicant: Oliver Joen-an Ma, Arcadia, CA (US)

(72) Inventor: Oliver Joen-an Ma, Arcadia, CA (US)

(*) Notice: Subject to any disclaimer, the term of this patent is extended or adjusted under 35 U.S.C. 154(b) by 457 days.

(21) Appl. No.: 13/657,162

(22) Filed: Oct. 22, 2012

(65) Prior Publication Data

US 2013/0146740 A1 Jun. 13, 2013

(30) Foreign Application Priority Data

Dec. 13, 2011 (CN) .......................... 2011 1 0412283
Jan. 11, 2012 (CN) ..................... 2012 2 0011685 U

(51) Int. Cl.
*E04H 12/22* (2006.01)
*F16M 13/00* (2006.01)
(Continued)

(52) U.S. Cl.
CPC ...... *E04H 12/2246* (2013.01); *E04H 12/2238* (2013.01); *E04H 12/2269* (2013.01); *F16M 13/00* (2013.01); *A45B 2023/0006* (2013.01); *A45B 2023/0012* (2013.01); *A45B 2025/003* (2013.01); *E04H 12/22* (2013.01); *F16M 2200/08* (2013.01); *G09F 15/0062* (2013.01); *Y10S 248/91* (2013.01)

(58) Field of Classification Search
CPC ........................... E04H 12/2246; E01F 9/0124
See application file for complete search history.

(56) References Cited

U.S. PATENT DOCUMENTS 1,261,142 A   4/1918   McNichol
1,711,831 A   5/1929   Clavin
(Continued)

FOREIGN PATENT DOCUMENTS

DE       93 13 372        10/1993
DE    202006002271 U1      6/2006
(Continued)

OTHER PUBLICATIONS

Activa Leisure, 2010 Product Catalog.
(Continued)

*Primary Examiner* — Joshua J Michener
*Assistant Examiner* — Chiedu Chibogu
(74) *Attorney, Agent, or Firm* — Knobbe, Martens, Olson & Bear, LLP

(57) ABSTRACT

A foldable umbrella base may include a cross-piece having a ground engaging portion and an upright receptacle configured to receive an umbrella pole. The foldable umbrella base may also include a foldable container comprising a ballast retaining space configured to receive and retain a ballast material. The foldable umbrella base may also include a foldable cover configured to be disposed over the foldable container to enclose the foldable container and cross-piece while permitting the umbrella pole to extend therethrough. A first plurality of retainers may be coupled to a side surface of the foldable container may be configured to receive and hold a corresponding first plurality of rigid members such that the first plurality of retainers can provide structural support to the foldable container, whereby the foldable container can retain a shape upon receiving the ballast.

30 Claims, 9 Drawing Sheets

(51) Int. Cl.
  *A45B 23/00* (2006.01)
  *A45B 25/00* (2006.01)
  *G09F 15/00* (2006.01)

(56) References Cited

U.S. PATENT DOCUMENTS

| | | | |
|---|---|---|---|
| 1,940,523 A | 12/1933 | Barclay | |
| 2,036,033 A * | 3/1936 | Fisher | 135/133 |
| 2,146,658 A * | 2/1939 | Stanley | 156/222 |
| 2,652,845 A * | 9/1953 | O'Neill et al. | 135/90 |
| 2,952,471 A | 9/1960 | Thorpe | |
| 3,025,058 A | 3/1962 | Brumfield | |
| 3,179,438 A | 4/1965 | Field | |
| 3,259,432 A | 7/1966 | Jackson | |
| 3,353,837 A | 11/1967 | Marcyan | |
| 3,372,855 A * | 3/1968 | Smith | B65D 5/446 |
| | | | 206/386 |
| 3,606,445 A | 9/1971 | Wunderlich | |
| 3,632,029 A * | 1/1972 | Sonner | 224/275 |
| 3,633,242 A | 1/1972 | Wasofsky | |
| 3,635,491 A | 1/1972 | Drews et al. | |
| 3,841,631 A | 10/1974 | Dolan | |
| 3,949,901 A * | 4/1976 | Tokita | B65D 88/1668 |
| | | | 220/501 |
| 4,000,750 A | 1/1977 | Becher | |
| 4,063,616 A | 12/1977 | Gutierrez | |
| 4,069,559 A | 1/1978 | Weman | |
| 4,148,455 A | 4/1979 | Oliver | |
| 4,249,282 A | 2/1981 | Little | |
| 4,296,693 A | 10/1981 | Archer | |
| 4,591,126 A | 5/1986 | Berney | |
| D286,116 S | 10/1986 | Tegze | |
| 4,790,029 A * | 12/1988 | LaFleur et al. | 383/24 |
| D305,702 S | 1/1990 | Taliani et al. | |
| 4,903,859 A * | 2/1990 | Derby et al. | 383/41 |
| 4,973,327 A * | 11/1990 | Goodrich, Jr. | A61J 1/10 |
| | | | 383/119 |
| 5,104,236 A * | 4/1992 | LaFleur | 383/17 |
| 5,152,495 A | 10/1992 | Jacinto et al. | |
| 5,158,369 A * | 10/1992 | Derby | B65D 88/1625 |
| | | | 383/104 |
| 5,167,393 A | 12/1992 | Hayakawa et al. | |
| 5,207,407 A | 5/1993 | Fitzsimmons et al. | |
| 5,209,364 A * | 5/1993 | LaPoint, Jr. | B65D 88/1625 |
| | | | 220/4.28 |
| 5,220,740 A | 6/1993 | Brault | |
| 5,248,140 A | 9/1993 | Matherne et al. | |
| 5,257,983 A * | 11/1993 | Garyantes | A61M 1/0272 |
| | | | 383/104 |
| 5,259,612 A | 11/1993 | Matherne et al. | |
| 5,283,595 A | 2/1994 | Krukovsky | |
| 5,289,937 A * | 3/1994 | Boots | 220/9.1 |
| 5,322,023 A | 6/1994 | Hammond | |
| 5,323,922 A * | 6/1994 | Lapoint et al. | 220/4.28 |
| 5,328,268 A * | 7/1994 | Lafleur | 383/119 |
| 5,330,213 A | 7/1994 | Peruso | |
| D350,041 S | 8/1994 | Schwarzli | |
| 5,337,989 A | 8/1994 | Apple | |
| 5,354,049 A | 10/1994 | Matherne et al. | |
| 5,375,835 A | 12/1994 | Van Nimwegen et al. | |
| 5,423,611 A * | 6/1995 | Sherrard | 383/24 |
| 5,452,877 A * | 9/1995 | Riffle | E04H 12/2246 |
| | | | 135/16 |
| 5,480,191 A | 1/1996 | Litin et al. | |
| 5,481,822 A * | 1/1996 | Engels | 43/54.1 |
| 5,492,429 A | 2/1996 | Hodges | |
| 5,520,982 A * | 5/1996 | Grigsby | B31B 7/00 |
| | | | 108/51.3 |
| 5,538,155 A * | 7/1996 | Hoekstra | B65D 88/1631 |
| | | | 220/495.01 |
| 5,599,037 A | 2/1997 | Spickler | |
| 5,615,451 A | 4/1997 | Peterson et al. | |
| 5,628,522 A | 5/1997 | Hall | |
| 5,628,523 A | 5/1997 | Smith | |
| 5,636,649 A | 6/1997 | Horvath | |
| 5,730,668 A | 3/1998 | Hege et al. | |
| 5,743,283 A | 4/1998 | Horvath | |
| 5,823,213 A * | 10/1998 | Patarra | 135/16 |
| 5,826,850 A | 10/1998 | Goldsmith | |
| 5,839,714 A | 11/1998 | Fitzsimmons et al. | |
| 5,843,556 A * | 12/1998 | Levas | 428/99 |
| 5,865,541 A * | 2/1999 | Lafleur | 383/120 |
| 5,871,148 A * | 2/1999 | Hafer | B65D 5/443 |
| | | | 229/199 |
| 5,940,932 A | 8/1999 | LaHay | |
| 5,957,145 A | 9/1999 | Plumer | |
| 5,964,533 A * | 10/1999 | Ziglar | 383/36 |
| 5,968,204 A * | 10/1999 | Wise | 8/142 |
| 5,979,793 A | 11/1999 | Louis | |
| 6,000,549 A * | 12/1999 | Perkins | B65D 77/061 |
| | | | 206/596 |
| 6,015,057 A * | 1/2000 | Stone | B65D 88/1625 |
| | | | 220/9.2 |
| 6,089,394 A * | 7/2000 | Ziglar | 220/6 |
| 6,102,569 A * | 8/2000 | Wang | 383/104 |
| 6,105,305 A * | 8/2000 | Edens | 43/54.1 |
| 6,109,786 A * | 8/2000 | Hafer et al. | 383/119 |
| 6,113,054 A | 9/2000 | Ma | |
| 6,113,270 A * | 9/2000 | Hafer | 383/119 |
| 6,149,025 A * | 11/2000 | Wang | 220/6 |
| 6,196,719 B1 * | 3/2001 | Brown | B65D 88/1625 |
| | | | 383/104 |
| 6,203,198 B1 * | 3/2001 | Stone | B65D 88/1625 |
| | | | 220/9.2 |
| 6,220,755 B1 * | 4/2001 | Brown et al. | 383/119 |
| 6,305,659 B1 | 10/2001 | Metelski | |
| 6,328,470 B2 * | 12/2001 | Brown et al. | 383/119 |
| 6,336,450 B1 | 1/2002 | Collet | |
| 6,367,494 B1 | 4/2002 | Tung | |
| 6,374,839 B2 | 4/2002 | Patarra | |
| 6,405,990 B2 | 6/2002 | Davis et al. | |
| 6,412,746 B2 | 7/2002 | Davis et al. | |
| 6,412,747 B2 | 7/2002 | Davis et al. | |
| 6,415,927 B1 * | 7/2002 | Stone et al. | 206/600 |
| 6,446,408 B1 | 9/2002 | Gordin et al. | |
| 6,446,930 B1 | 9/2002 | Li | |
| D464,190 S | 10/2002 | Salahub | |
| 6,481,591 B2 * | 11/2002 | Mendoza et al. | 220/9.2 |
| 6,488,254 B2 | 12/2002 | Li | |
| 6,511,033 B2 | 1/2003 | Li | |
| D470,305 S | 2/2003 | Clarke | |
| 6,523,640 B1 | 2/2003 | Young et al. | |
| 6,554,012 B2 | 4/2003 | Patarra | |
| 6,554,243 B2 | 4/2003 | Davis et al. | |
| 6,594,951 B1 | 7/2003 | Reynolds | |
| 6,637,717 B2 | 10/2003 | Li | |
| D484,303 S | 12/2003 | Taylor | |
| 6,658,760 B2 * | 12/2003 | Kohlman et al. | 34/311 |
| 6,669,045 B2 * | 12/2003 | Wang | 220/9.2 |
| D485,055 S | 1/2004 | Taylor | |
| 6,682,055 B1 | 1/2004 | Tomlinson et al. | |
| 6,732,752 B2 | 5/2004 | Cohen et al. | |
| 6,796,319 B1 | 9/2004 | Patarra et al. | |
| 6,869,058 B2 | 3/2005 | Tung | |
| 6,889,953 B2 | 5/2005 | Harbough | |
| D516,297 S | 3/2006 | Smith et al. | |
| 7,090,399 B2 * | 8/2006 | Godshaw et al. | 383/119 |
| 7,140,581 B2 | 11/2006 | White | |
| 7,143,601 B1 | 12/2006 | Jimenez | |
| 7,163,212 B1 | 1/2007 | Rupp | |
| 7,195,397 B2 * | 3/2007 | Williamson et al. | 383/33 |
| 7,285,111 B2 * | 10/2007 | Gaster | A61M 5/1415 |
| | | | 604/131 |
| 7,331,684 B2 | 2/2008 | Tung | |
| 7,347,428 B2 | 3/2008 | Edenso | |
| D568,603 S | 5/2008 | Smith et al. | |
| D573,786 S | 7/2008 | Smith et al. | |
| D574,143 S | 8/2008 | Smith et al. | |
| D575,053 S | 8/2008 | Smith et al. | |
| D578,749 S | 10/2008 | Ng | |
| 7,431,259 B2 | 10/2008 | Tung | |
| 7,484,704 B2 | 2/2009 | Schommertz | |
| 7,503,541 B2 | 3/2009 | Harold et al. | |

(56) References Cited

U.S. PATENT DOCUMENTS

| | | | |
|---|---|---|---|
| 7,513,479 B2 | 4/2009 | Li | |
| 7,520,485 B1 | 4/2009 | Giannetto | |
| 7,537,015 B1 | 5/2009 | Molnar, IV et al. | |
| 7,575,117 B2* | 8/2009 | Redzisz | A45C 7/0036 206/373 |
| 7,584,563 B2 | 9/2009 | Hillstrom et al. | |
| 7,600,917 B2* | 10/2009 | Richardson, Jr. | B65D 88/1612 220/9.4 |
| 7,614,600 B1 | 11/2009 | Smith et al. | |
| 7,641,165 B2 | 1/2010 | Li | |
| D617,041 S | 6/2010 | Shi | |
| 7,753,546 B2 | 7/2010 | Kuelbs | |
| D621,148 S | 8/2010 | Brady | |
| D621,149 S | 8/2010 | Brady | |
| 7,784,761 B2 | 8/2010 | Ma | |
| 7,836,902 B2 | 11/2010 | Tung | |
| 7,891,633 B2 | 2/2011 | Li | |
| 7,958,901 B2 | 6/2011 | Lai | |
| 8,047,217 B1 | 11/2011 | Schermerhorn, Jr. | |
| 8,070,006 B2* | 12/2011 | Austin et al. | 220/9.2 |
| 8,104,492 B2 | 1/2012 | Dan | |
| D655,531 S | 3/2012 | Gharst | |
| 8,485,757 B2* | 7/2013 | Nomoto | 405/107 |
| 8,556,100 B2* | 10/2013 | Austin et al. | 220/9.2 |
| 8,567,729 B2 | 10/2013 | Nemish | |
| D697,705 S | 1/2014 | Ma | |
| 8,632,045 B2 | 1/2014 | Ma | |
| 8,657,246 B2 | 2/2014 | Ma | |
| 8,714,511 B2 | 5/2014 | Zoeteman | |
| 8,807,513 B2 | 8/2014 | Volin | |
| 8,894,281 B2* | 11/2014 | Town | B65D 88/1618 294/74 |
| 8,919,361 B2 | 12/2014 | Ma | |
| 8,919,722 B2 | 12/2014 | Ma | |
| 8,960,625 B2 | 2/2015 | Ma | |
| D724,309 S | 3/2015 | Ma | |
| D732,817 S | 6/2015 | Elstow | |
| D740,546 S | 10/2015 | DeVaney | |
| 2001/0013358 A1 | 8/2001 | Patarra | |
| 2001/0040208 A1 | 11/2001 | Li | |
| 2001/0045498 A1 | 11/2001 | Davis et al. | |
| 2002/0185582 A1 | 12/2002 | Li | |
| 2003/0145498 A1 | 8/2003 | Venegas, Jr. | |
| 2003/0230692 A1 | 12/2003 | Davis et al. | |
| 2004/0056169 A1 | 3/2004 | Harbough | |
| 2004/0069922 A1 | 4/2004 | Wu | |
| 2004/0108439 A1 | 6/2004 | Ma | |
| 2004/0163336 A1 | 8/2004 | Hsu | |
| 2004/0177871 A1 | 9/2004 | Harbough | |
| 2004/0195487 A1 | 10/2004 | Harbough | |
| 2005/0023428 A1* | 2/2005 | Woude | E01F 9/692 248/530 |
| 2005/0161067 A1 | 7/2005 | Hollins | |
| 2005/0189005 A1 | 9/2005 | Smith et al. | |
| 2006/0054206 A1 | 3/2006 | Bilottii | |
| 2007/0080277 A1 | 4/2007 | Chen | |
| 2008/0111046 A1 | 5/2008 | Tung | |
| 2008/0224016 A1 | 9/2008 | Defu et al. | |
| 2009/0174162 A1 | 7/2009 | Gass et al. | |
| 2009/0320341 A1 | 12/2009 | Hillstrom et al. | |
| 2010/0065709 A1 | 3/2010 | Ying | |
| 2010/0147341 A1 | 6/2010 | Li | |
| 2010/0206346 A1 | 8/2010 | Tung | |
| 2011/0232704 A1 | 9/2011 | Li | |
| 2012/0024329 A1 | 2/2012 | Ma | |
| 2012/0125388 A1 | 5/2012 | Kuo | |
| 2013/0146739 A1 | 6/2013 | Zhao | |
| 2014/0174254 A1 | 6/2014 | Ma | |
| 2014/0190294 A1 | 7/2014 | Ma | |
| 2014/0230866 A1 | 8/2014 | Paolucci | |
| 2014/0263926 A1 | 9/2014 | LeAnna | |

FOREIGN PATENT DOCUMENTS

| | | |
|---|---|---|
| EP | 0 060 957 | 9/1982 |
| EP | 0 818 594 | 1/1998 |
| EP | 0 822 305 | 2/1998 |
| FR | 2 576 048 | 7/1986 |

OTHER PUBLICATIONS

Treasure Garden, 2010 Product Catalog.

Extended European Search Report issued in European Patent Application No. 14185666.6, dated Jun. 24, 2015.

* cited by examiner

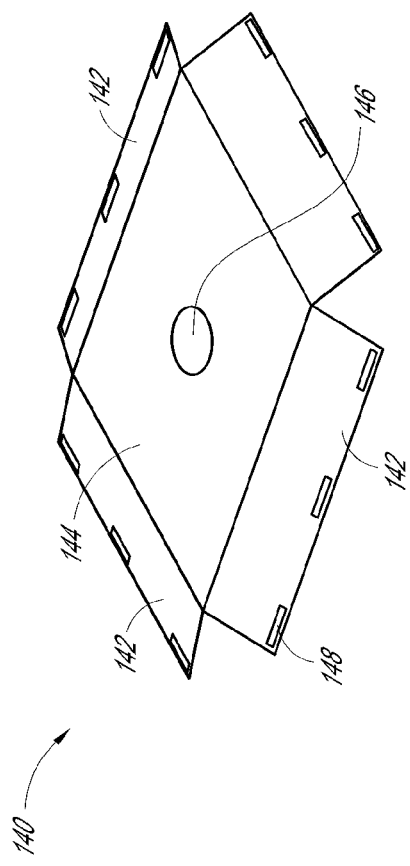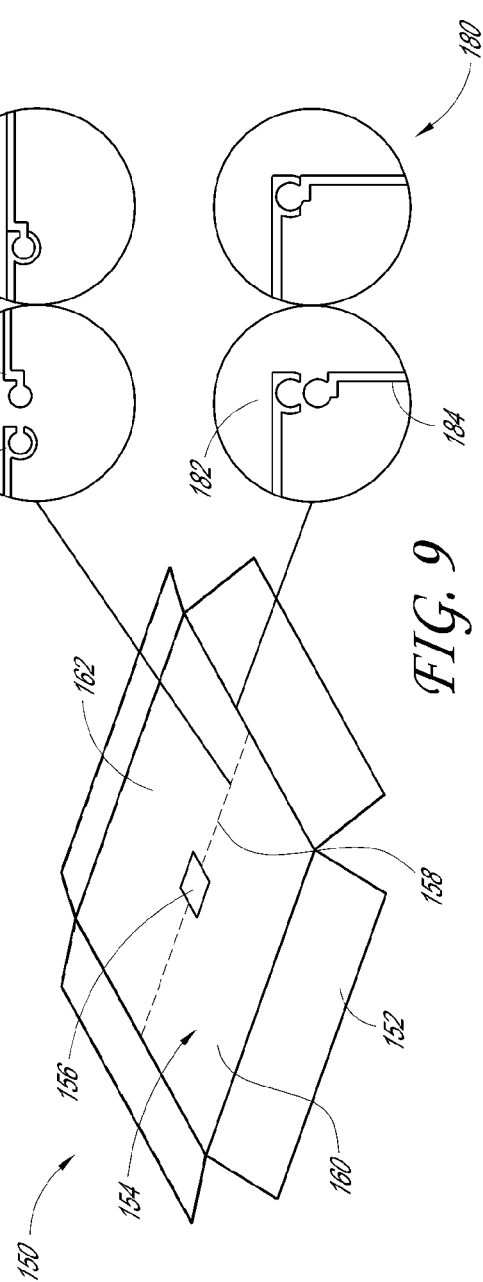

SHAPE RETAINING FOLDABLE UMBRELLA BASE

CROSS-REFERENCE TO RELATED APPLICATIONS

This application claims priority under 35 U.S.C. §119 to Chinese Patent Application No. CN 201110412283.7, filed Dec. 13, 2011, and to Chinese Patent Application No. CN 201220011685.6, filed Jan. 11, 2012, which are hereby incorporated herein by reference in their entirety.

BACKGROUND OF THE INVENTION

Field

This invention relates to an umbrella assembly, more particularly it relates to an umbrella base of an umbrella.

Description of the Related Art

Large umbrellas, including for example patio umbrellas, typically are connected to an umbrella base to maintain the umbrella in an upright position. Ballast material can be used to weigh down the umbrella base to keep the umbrella upright. Examples of ballast include concrete, stone, sand and other heavy flowable materials.

Umbrella bases with such ballast materials generally are not easily transported, or compactly stored or packaged. Traditional umbrella bases may then be expensive to ship and/or difficult to move to a different location.

SUMMARY

A foldable umbrella base may enable easy transport, storage and/or packaging of the umbrella base. In some embodiments, the foldable umbrella base is collapsible, for example when the base is not in use for weighing down an umbrella. In some embodiments, the foldable umbrella base retains a shape when a ballast material is inserted into the umbrella base, for example when the base is used for weighing down an umbrella. The foldable umbrella base may comprise rigid or substantially rigid components to enable the foldable umbrella base to retain the shape when stepped on and/or kicked at by a user. For example, the umbrella base having the rigid or substantially rigid components may be able to support an entire weight of an adult person such that the base may be able to retain or substantially retain the shape when the person stands upon the umbrella base. The foldable umbrella base may comprise lightweight materials to enable a portable umbrella base, facilitating for example shipping, storage and/or packaging of the base. In some embodiments, the base comprises cost-effective materials, to enable for example cost savings in manufacturing of the base.

In some embodiments, a foldable umbrella base comprises a cross-piece having a ground engaging portion and an upright receptacle configured to receive an umbrella pole. An umbrella base may also comprise a foldable container comprising a ballast retaining space configured to receive and retain a ballast material. In some embodiments, the foldable umbrella base comprises a first plurality of retainers configured to receive and hold a corresponding first plurality of rigid members, at least one of said first plurality of retainers comprising a pocket having an access opening and extending along a side surface of the container, said at least one of said first plurality of retainer also having a closure device disposable over the pocket. The first plurality of rigid members may be configured to be coupled with the first plurality of retainers to provide structural support to the container, whereby the container can retain a shape upon receiving the ballast. In some embodiments, the foldable umbrella comprises a cover configured to be disposed over the foldable container to enclose the foldable container and cross-piece and to permit the umbrella pole to extend therethrough.

In some embodiments, the foldable container comprises a pocket disposed on each of four lateral sides configured to receive a rectangular rigid member, whereby the foldable container maintains a rectangular shape upon receiving the ballast. In some embodiments, the foldable container comprises a plurality of lateral walls and an external bottom surface, the external bottom surface having a recessed zone configured to receive the cross-piece. A protrusion corresponding to the recessed zone may be disposed on an internal bottom surface. For example, the ballast receiving space may be at least partially defined by a plurality of lateral walls and an internal bottom surface of the foldable container.

In some embodiments, the foldable container comprises a sleeve extending through the ballast receiving space and configured to be foldable with the container to a lower profile configuration. The sleeve may at least partially define the ballast receiving space. In some embodiments, the sleeve comprises at least one retainer, including for example a plurality of pockets, configured to receive a rigid member to provide structural support to the sleeve, whereby the sleeve can retain a shape upon the ballast being received in the ballast receiving space.

In some embodiments, the cover rigidly encloses, in combination with a surface upon which the cover is place, a space at least as voluminous as the foldable container, the cover being collapsible by de-coupling an engagement device disposed between two adjacent panels thereof. The foldable umbrella base may comprise a device to join the cover to the foldable container.

In some embodiments, the foldable container comprises a resealable access opening, including for example a zipper, configured to allow insertion or removal of the ballast material into or out of the ballast retaining space. In some embodiments, the foldable container comprises a top surface having an aperture to allow placement of the container over the upright receptacle. The foldable container may comprise a second plurality of retainers positioned along one or more vertical surfaces that define, at least in part, the recessed zone, the second plurality of retainers being configured to receive and hold a second plurality of rigid members.

In some embodiments, a ballast retaining space may comprise a plurality of ballast retaining spaces, each of the plurality of ballast retaining spaces being defined at least in part by a lateral surface, a top surface, and a surface formed along at least a part of the recessed portion, and the foldable container comprising a corresponding resealable access opening for each of the plurality of ballast retaining spaces to allow independent insertion or removal of the ballast material into or out of each of the plurality of ballast retaining spaces. The recessed zone may compromise a height substantially equal to the height of the foldable container such that at least one of the plurality of ballast retaining spaces is a substantially distinct space. The at least one of the plurality of ballast retaining spaces may comprise a substantially distinct ballast retaining space having a triangular shape, the substantially distinct ballast retaining space defined at least in part by a vertical surface formed along the recessed zone.

In some embodiments, the cover is foldable. The foldable cover may include a plurality of retainers configured to receive and hold a corresponding plurality of rigid members. At least one of said retainers can comprise a pocket having an access opening and extending along a surface of the cover.

In some embodiments, the cover comprises a plurality of segments adapted to be joined to enclose a space. A plurality of separable panels may be configured to be pieced together to form an upper surface of the cover, the separable panels being releasably held together along one or more adjacent edges.

In some embodiments, a stabilizing device for an umbrella can include a foldable container having at least one space configured to receive and retain a ballast material, the foldable container including a plurality of retainers configured to receive and hold a corresponding plurality of rigid members. At least one of the retainers can comprise a pocket having an access opening. The pocket can extend along a side surface of the container. The stabilizing device may include one or a plurality of rigid members configured to be coupled with said retainers to provide structural support to the container, whereby the container can retain a shape upon receiving the ballast.

In some embodiments, a foldable umbrella base can include a foldable container comprising a ballast retaining space. The foldable container may be configured to be placed over at least a portion of a base piece having an upright receptacle for receiving an umbrella pole such that the upright receptacle is permitted to extend through the foldable container. The base piece can be a cross-shaped support structure, as discussed below. The foldable umbrella base may include a plurality of retainers configured to be coupled to a corresponding plurality of rigid members. At least one of said retainers can comprise a pocket positioned on a lateral surface of the foldable container. The rigid members can be configured to be coupled with the retainers to provide structural support to the foldable container. The foldable container can retain a shape upon receiving a ballast material. The foldable umbrella base may include a cover configured to be placed over the foldable container and the base piece such that the upright receptacle of the base piece is permitted to extend through the cover.

In some embodiments, the base piece comprises a structure configured to prevent tipping of the base, e.g. one with wide-spread lateral members, such as a cross-piece. In some embodiments, the pocket can be positioned along a length of the lateral surface and configured to receive and enclose the rigid member. In some embodiments, the cover can include a foldable cover having separable panels configured to be coupled together through one or more engagement devices to form a flush upper surface.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

FIG. 8 shows an embodiment of an umbrella base cover.

FIG. 9 shows another embodiment of an umbrella base cover.

DETAILED DESCRIPTION OF SOME EMBODIMENTS

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

Figure 1:
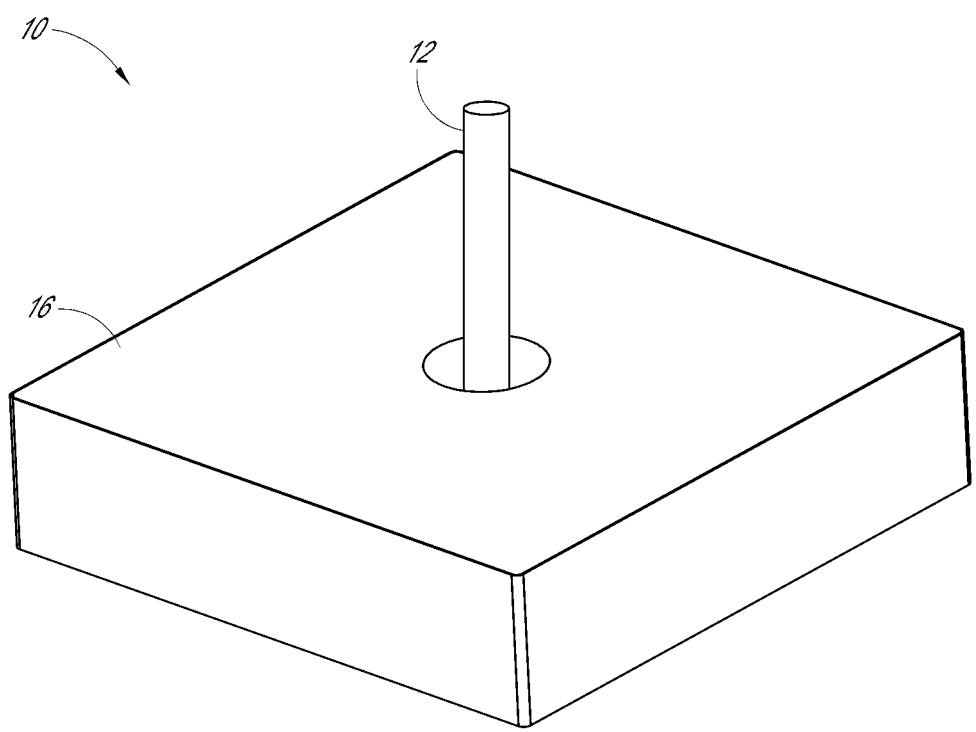
FIG. 1 shows an embodiment of an umbrella base assembly comprising a cover positioned over a foldable container.
Figure 2:
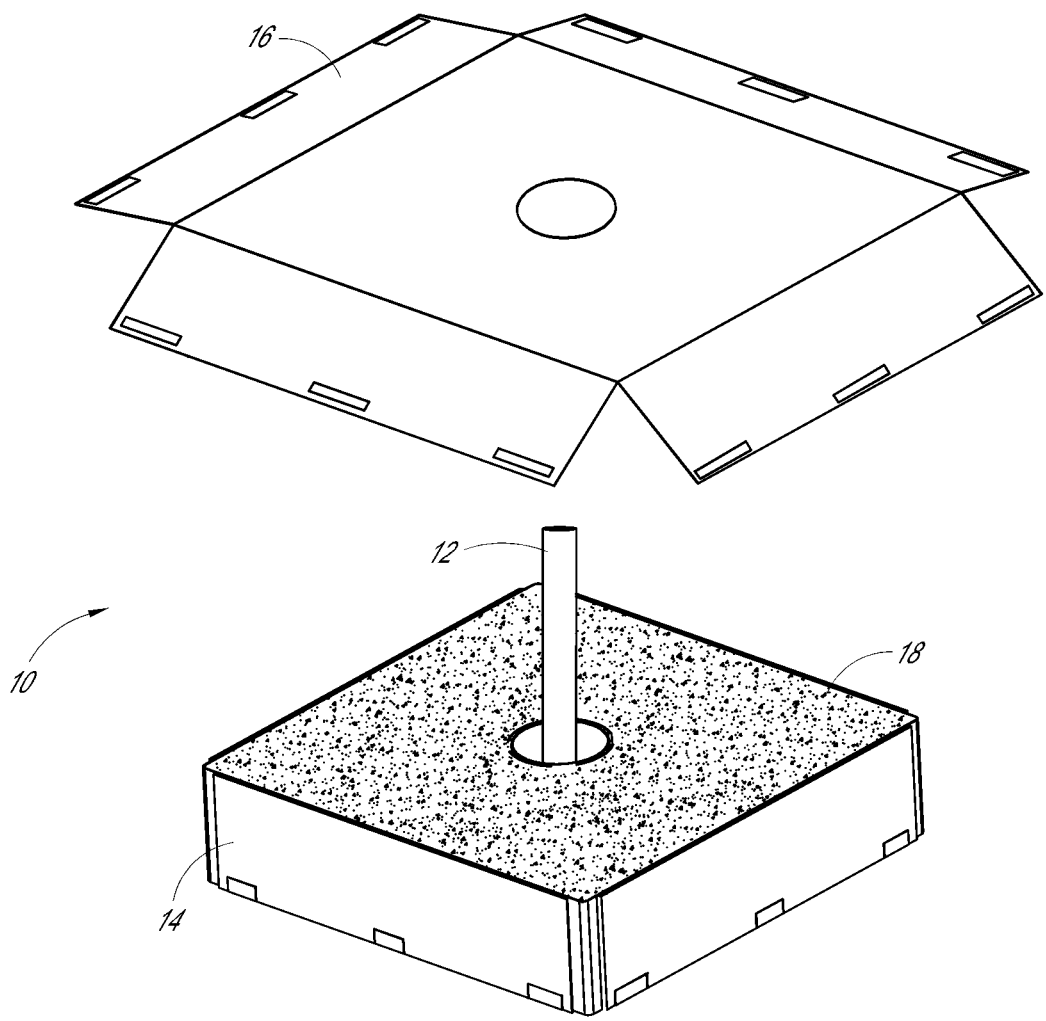
FIG. 2 is an exploded view of the umbrella base assembly of FIG. 1.

Referring to FIGS. 1 and 2, an umbrella base 10, sometimes referred to herein as an umbrella base assembly, may include a cross-piece 12, a foldable container 14, and a cover 16. In some embodiments, the cover 16 may be foldable. For example, the cover 16 and the foldable container 14 may be collapsible to facilitate transport, packaging, and/or storage of the umbrella base 10. In some embodiments, the foldable container 14 is configured to receive and retain the ballast material 18. The foldable container 14 may retain a shape when the ballast material 18 is placed within the foldable container 14. Suitable ballast material 18 may include, for example, sand, pebbles, crushed rocks, and/or combinations thereof. Other readily available materials suitable for weighing down an umbrella base can also be used.

In some embodiments, the foldable container 14 is configured to retain the ballast material 18 and is placeable over the cross-piece 12. In some embodiments, the cover 16 is placeable over the foldable container 14 and is configured to receive an upright receptacle of the cross-piece 12. As shown in FIG. 2, the foldable container 14 and the cover 16 may comprise a rectangular shape such that when the foldable container 14 is placed over the cross-piece 12, and the cover 16 is placed over the foldable container 14, the umbrella base 10 may comprise a rectangular or substantially rectangular shape.

Figure 3:
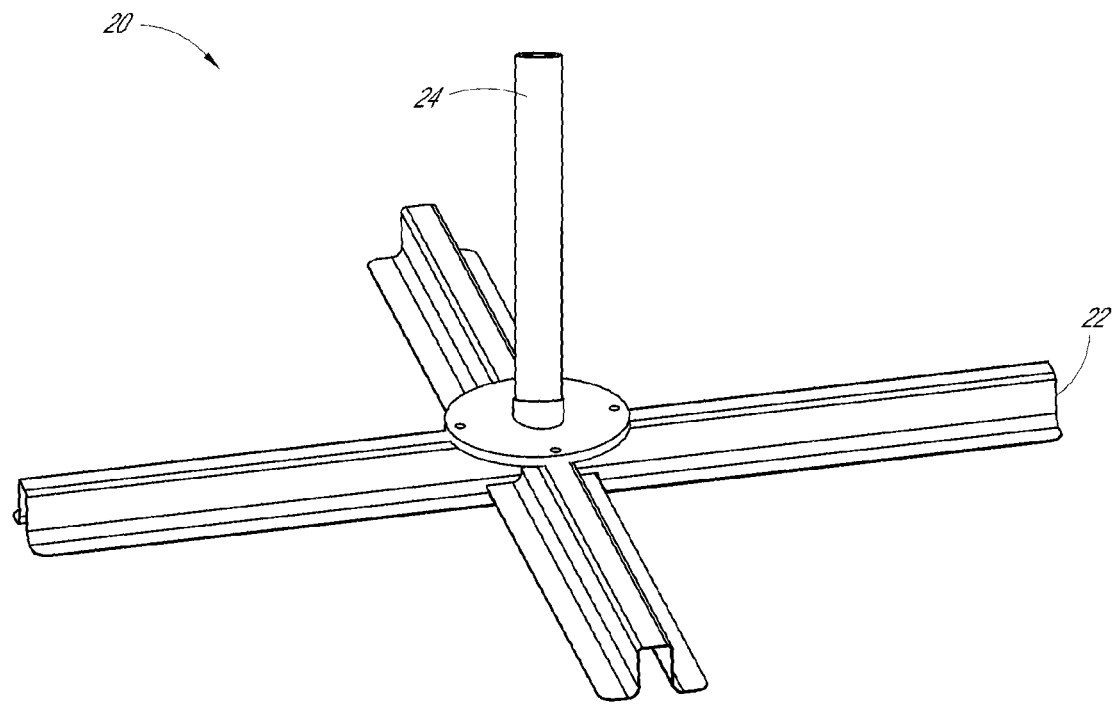
FIG. 3 shows an embodiment of an umbrella base cross-piece.

Referring to FIG. 3, an umbrella base 10 may optionally include a cross-piece 20. The cross-piece 12 may be the same as the cross-piece 20 or may have other configurations.

In some embodiments, the cross-piece 20 may have a ground engaging portion 22, and/or an upright receptacle 24 configured to receive an umbrella pole.

Figure 4:
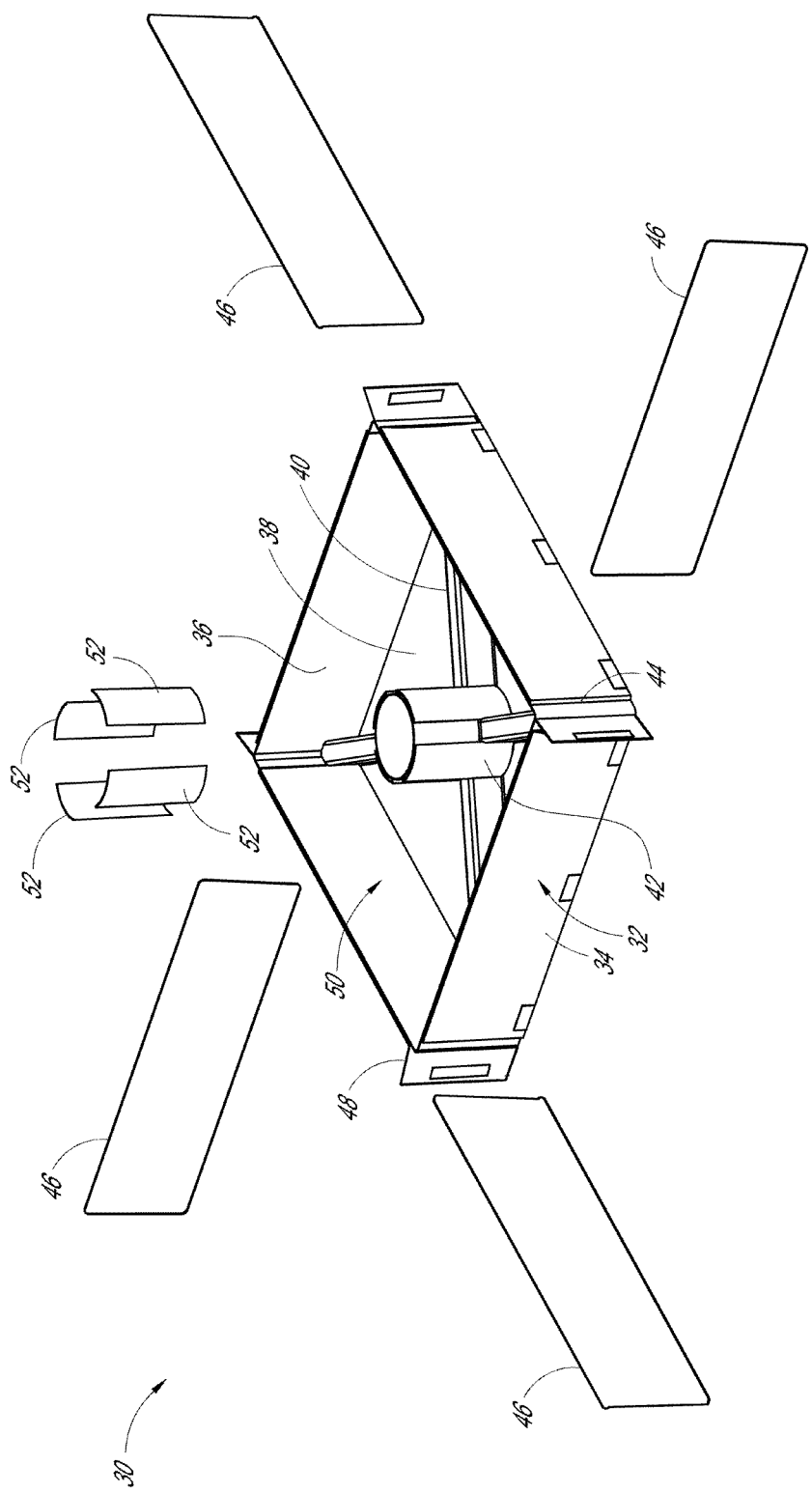
FIG. 4 shows an embodiment of a foldable container.

Referring to FIG. 4, in some embodiments, a foldable container 30 may have a plurality of, e.g., four, lateral portions 32. A lateral portion 32 may have an exterior lateral surface 34 and an interior lateral surface 36. The foldable container 30 may also comprise a bottom portion 38. In some embodiments, the bottom portion 38 may include a recessed zone 40. In some embodiments, the bottom portion 38 may comprise an exterior bottom surface and an interior bottom surface such that the recessed zone 40 is defined at least in part by or on the exterior bottom surface. The exterior bottom surface can be a surface that in use, at least a portion of which, engages the ground. The interior bottom surface can comprise a protrusion corresponding to the recessed zone 40. For example, the recessed zone 40 may be configured to be placed over a cross-piece ground engaging portion 22. The recessed zone 40 may or may not be configured to couple to the cross-piece ground engaging portion 22. As seen in FIG. 4, the recessed zone 40 can define a plurality of at least partially separated or segregated spaces for holding the ballast material 18.

Referring to FIG. 4, the umbrella base 10 may also include a first plurality of insertable members, e.g., lateral insertable members 46. For example, lateral insertable members 46 may be configured to couple to one or more lateral portions 32 of the foldable container 30. In some embodiments, the lateral insertable members 46 when coupled to a lateral portion 32 can enable the foldable container 30 to maintain an upright position when the ballast material 18 is placed into the foldable container 30. For example, the lateral insertable members 46 may be coupled to one or more lateral portions 32 to enable the foldable container 30 to maintain or substantially maintain a shape when the ballast material 18 is place within the foldable container 30. The lateral insertable members 46 may be rigid or substantially rigid. Suitable material for the lateral insertable members 46 may comprise any material having sufficient rigidity to enable the foldable container 30 to maintain a shape when the ballast material 18 is placed into the foldable container 30. For example, suitable material for the lateral insertable members 46 may include a rigid polymeric material, a wood material, cardboard paper, a metallic material, and/or combinations thereof. The lateral insertable members 46 may be rectangular in shape such that when the lateral insertable members 46 are coupled to the one or more lateral portions 32, the foldable container 30 comprises a rectangular or substantially rectangular shape when the ballast material 18 is placed into the foldable container 30. The lateral insertable members 46 may comprise other shapes. In addition, more than one lateral insertable member 46 can be inserted into or coupled with each lateral portion 32.

In some embodiments, one or more of the lateral portions 32 include a first plurality of retainers 44 configured for coupling the lateral portions 32 to the one or more lateral insertable members 46. In some embodiments, the retainers 44 may be positioned on and/or along an exterior lateral surface 34 and/or an interior lateral surface 36 of a lateral portion 32. The retainer 44 may comprise one or more pockets configured to receive a lateral insertable member 46. In some embodiments, the pockets may be positioned along an exterior 34 and/or an interior lateral surface 36. For example, the retainer 44 may comprise a pocket positioned along an exterior lateral surface 34, including for example substantially the entire length of the exterior lateral surface 34, the pocket having an opening into which a lateral insertable member 46 may be placed. In some embodiments, the retainer 44 comprises one or more pockets. In some embodiments, the retainer 44 may comprise pockets configured to receive a portion of a lateral insertable member 46. The retainer 44 may be shaped for coupling with a lateral insertable member 46 having a rectangular or substantially rectangular shape. For example, the retainer 44 may be shaped for coupling with a corner portion, a side portion, and/or the entire or substantially entire rectangular shaped lateral insertable member 46.

In some embodiments, a retainer 44 includes a closure device 48. The closure device 48 may be positioned along a side of an exterior surface 34 and/or an interior surface 36 of a lateral portion 32. In some embodiments, the closure device 48 comprises a flap structure foldable over a retainer 44, for example a retainer 44 comprising a pocket. The closure device 48 may comprise a resealable engagement device, for example a hook and loop fastener (e.g. Velcro®). Other resealable engagement devices may also be suitable, including for example, a zipper and/or a button fastener. In some embodiments, the retainer 44 comprises a pocket closed on three sides, e.g., having an opening along a short side thereof disposed lateral to the longitudinal axis of the lateral surface 34. The closure device 48 can enclose, in one position, the opening and expose the opening in another position.

The foldable container 30 may comprise a sleeve 42 configured to receive an upright member or receptacle 24 of a cross-piece 20. The sleeve 42 may comprise a cylindrical or substantially cylindrical shape. Other shapes may also be suitable. The sleeve 42 may be foldable such that it may be collapsible to form a lower profiled configuration, to facilitate for example transport, packaging and/or storage of the umbrella base 10. In some embodiments, a ballast retaining space 50 is defined at least in part by and/or contained within a space defined at least in part by the interior lateral surface 36, an interior bottom surface of bottom portion 38 and/or one or more surfaces disposed along the sleeve 42.

In some embodiments, the umbrella base assembly 10 includes sleeve insertable members 52. The sleeve insertable members 52 can be configured as reinforcements or shape holding structures. The sleeve insertable members 52 may be configured to couple to the sleeve 42 through retainer devices disposed on the sleeve 42. Referring to FIG. 4, the sleeve insertable members 52 may enable the sleeve 42 to retain an upright position when the ballast material 18 is placed into the foldable container 30. For example, one or more curved sleeve insertable members 52 may be coupled to a sleeve 42 comprising a circular shape to enable the sleeve 42 to maintain an upright position when the ballast material 18 is placed into the foldable container 30. The sleeve insertable members 52 may be rigid or substantially rigid. Suitable material for the sleeve insertable members 52 may comprise any material having sufficient rigidity to enable the sleeve 42 to maintain an upright position when the ballast material 18 is placed into the container 30. For example, suitable material for the sleeve insertable members 52 may include a rigid polymeric material, a wood material, cardboard paper, a metallic material, and/or combinations thereof.

Figure 5:
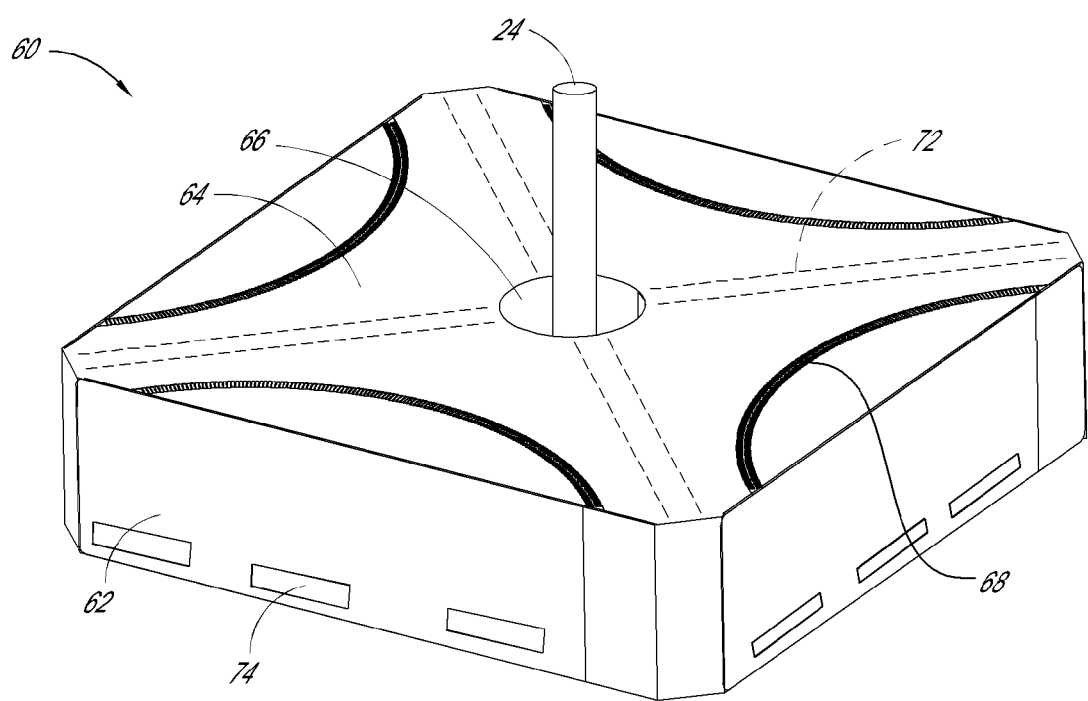
FIG. 5 shows an additional embodiment of an umbrella base assembly comprising a foldable container.
Figure 6:
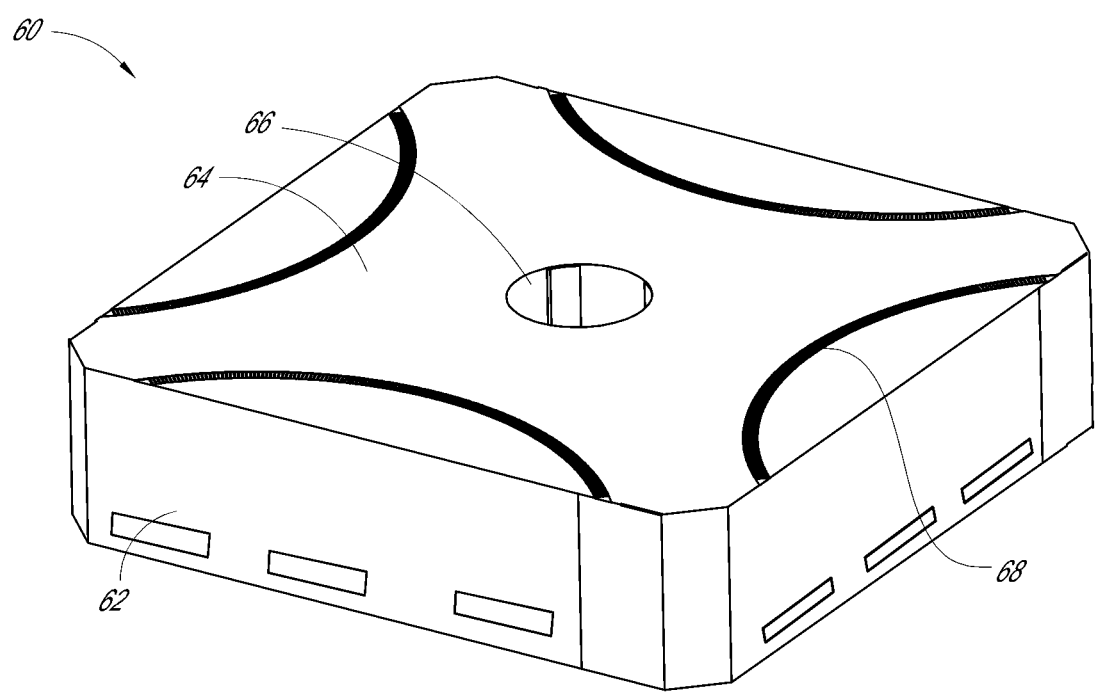
FIG. 6 shows another embodiment of a foldable container assembly, which is the same embodiment of FIG. 5 but with the upright receptacle removed.
Figure 7:
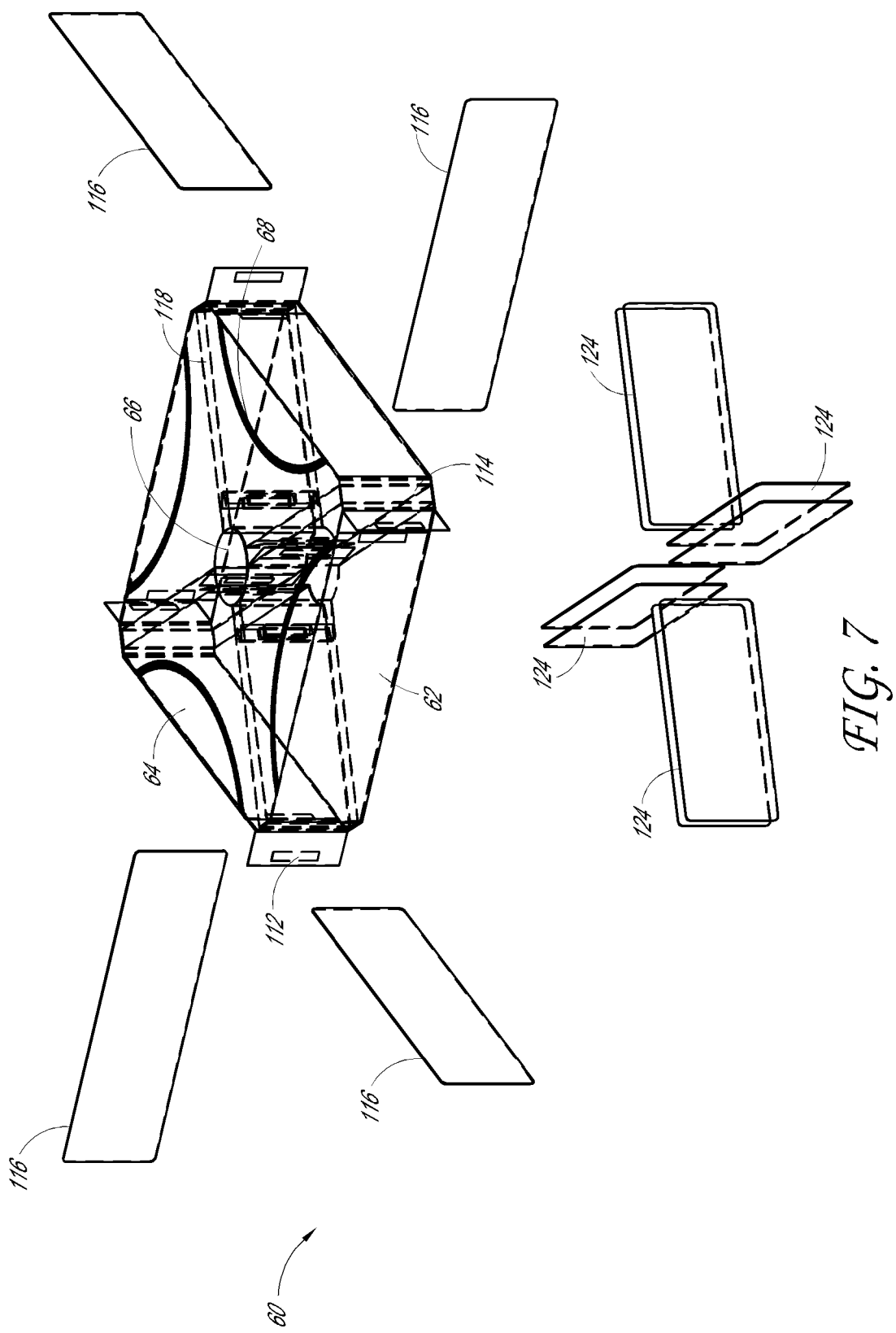
FIG. 7 shows an exploded embodiment of the foldable container assembly of FIG. 6.

Referring to FIGS. 5 and 6, in some embodiments, a foldable container 60 comprises an upper surface 64 and one or more lateral portions 62. The upper surface 64 may be configured to receive an upright member or receptacle 24 of a cross-piece 20. For example the upper surface 64 may include an opening 66 configured for receiving the upright member or receptacle 24. The opening 66 is also shown in FIG. 7. In some embodiments, the container 60 comprises a ballast retaining space defined and/or contained within a space defined at least in part by one or more lateral portions 62 and the upper surface 64. In some embodiments, the upper surface 64 comprises one or more resealable access openings 68 configured to enable placement of the ballast material 18 into or removal of the ballast material 18 from a ballast retaining space of the foldable container 60.

Referring to FIG. 5, in some embodiments, the foldable container 60 comprises a bottom portion 70 (not shown) that includes one or more recessed zones 72. In some embodiments, a recessed zone 72 comprises a height equal to or substantially equal to a height of the foldable container 60. Alternatively, a recessed zone 72 may comprise a height less than the height of the foldable container 60. The recessed zones 72 may comprise heights different from one another. For example, a ballast retaining space may be defined and/or contained within a space defined at least in part by a top surface 64, a lateral portion 62, and a vertical surface formed along a recessed zone 72. In some embodiments, the foldable container 60 comprises one or more distinct or substantially distinct ballast retaining spaces where each ballast retaining space is defined and/or contained within a space defined at least in part by a top surface 64, a lateral portion 62, and a vertical surface having a height substantially equal to that of the height of the foldable container 60 formed along a recessed zone 72. FIG. 5 shows, in some embodiments, the foldable container 60 comprises a rectangular shape such that the foldable container 60 comprises a plurality of distinct ballast retaining spaces comprising a triangular shape or a substantially triangular shape. In some embodiments, one or more of the plurality of ballast retaining spaces are defined and/or contained within a space defined at least in part by the top surface 64, a lateral portion 62 and a vertical surface formed along a recessed zone 72. In some embodiments, the top surface 64 comprises one or more openings corresponding to the one or more recessed zones 72 such that the ballast retaining space comprises a plurality of distinct or substantially distinct spaces.

In some embodiments, the foldable container 60 comprises one or more resealable access openings 68 on the top surface 64. Resealable access openings 68 may be positioned on other portions of the foldable container 60, including for example a lateral portion 62. In some embodiments, the foldable container 60 comprises one or more resealable access openings 68. For example, the foldable container 60 may comprise one or more resealable access openings 68 for each of a plurality of ballast retaining spaces to enable independent insertion and/or removal of ballast material 18 from each of the ballast retaining spaces. As shown in FIGS. 5 and 7, the foldable container 60 may comprise four resealable access openings 68, each facilitating access to a ballast retaining space defined and/or contained within a spaced defined at least in part by top surface 64, a lateral portion 62, and a vertical surface formed along a recessed zone 72.

A resealable access opening 68 may comprise any type of resealable opening that enables repeat access to a ballast retaining space. In some embodiments, a resealable access opening 68 comprises a zipper, and/or a hook and loop fastener (e.g. Velcro®).

A foldable container may be configured to couple to a cover (e.g. the foldable cover 16 of FIGS. 1 and 2). In some embodiments, the foldable container 60 comprises one or more corresponding fastening device portions 74 configured to couple the foldable container 60 to the cover, as described in more detail below.

FIG. 7 shows a foldable container 60 that can be incorporated into an umbrella base assembly. The foldable container 60 comprises a second plurality of retainers, e.g. recess insertable members 124 configured to couple to a vertical surface formed along a recessed zone 118. In some embodiments, the recessed zones 118 are configured for placement over the ground engaging portion 22 of a crosspiece 20. For example, the recess insertable members 124 may be configured to couple to a vertical surface formed along a recessed zone 118 to enable the foldable container 60 to retain a shape when the ballast material 18 is placed within a ballast retaining space of the container 60. In some embodiments, one or more recess insertable members 124 are configured to couple to each vertical surface formed along a recessed zone 118. For example, a recess insertable member 124 may comprise a shape and/or a dimension similar to that of a vertical surface formed along a recessed zone 118. Other shapes and/or dimensions may also be suitable. The recess insertable members 124 may be rigid or substantially rigid. Suitable material for the recess insertable members 124 may comprise any material having sufficient rigidity to enable the foldable container 60 to maintain a shape when the ballast material 18 is placed into the foldable container 60. For example, suitable material for the recess insertable members 124 may include a rigid polymeric material, a wood material, cardboard paper, a metallic material, and/or combinations thereof.

In some embodiments, the recess insertable members 124 are configured to couple to the sleeve 42. For example, one or more recess insertable members 124 may be configured to couple to the sleeve 42 to enable the foldable container 60 to retain a shape upon receiving the ballast material 18. The sleeve 42 may comprise one or more retainers configured to receive at least a portion of one or more recess insertable members 124. In some embodiments, one more pockets are positioned on the sleeve 42 and the pockets are configured to receive at least a portion of one or more recess insertable members 124, including for example, a side portion of the one or more insertable members 124.

In some embodiments, the foldable container 60 comprises one or more lateral insertable members 116 configured to couple to one or more lateral portions 62 and one or more recess insertable members 124 configured to couple to one or more vertical surfaces formed along the recessed zones 118. For example, the lateral insertable members 116 and the recess insertable members 124 may comprise a shape and/or a dimension similar to that of a lateral portion 62 and a vertical surface formed along a recessed zone 118, respectively, such that the foldable container 60 retains a shape when the ballast material 18 is placed within the foldable container 60. The lateral insertable members 116 and the recess insertable members 124 may comprise other shapes and/or dimensions. FIG. 7 shows that a lateral portion 62 can comprise a retainer 114 configured to receive a corresponding lateral insertable member 116. The retainer 114 can include a closure device 112.

The foldable container (e.g. foldable container 60) may comprise flexible materials enabling collapsing and/or folding of the foldable container to form a lower-profile configuration, for example enabling a reduction in a volume and/or a footprint of the foldable container to facilitate packaging, storage and/or transport. Suitable materials for the foldable container may include woven fabric, a polymeric material, and/or combinations thereof. For example, the foldable container may comprise canvas fabric (e.g., awning-grade canvas material).

The umbrella base 10 may also include a cover configured to be placeable over a foldable container (e.g. the foldable container 60 of FIG. 7). Referring to FIG. 8, a cover 140 may comprise one or more lateral panels 142 coupled to an upper surface 144. In some embodiments, the one or more lateral panels 142 and/or the upper surface 144 can comprise rigid or substantially rigid material (e.g., polymeric material, a wood material, cardboard paper, a metallic material). In some embodiments, the upper surface 144 is configured such that the cover 140 may be placeable over an upright receptacle 24 for receiving an umbrella pole. The upper surface 144 may include an opening 146 configured to receive the upright receptacle 24, the opening 146 comprising a variety of shapes, including for example a circular or substantially circular shape.

In some embodiments, the cover 140 may be foldable. A foldable cover 140 may facilitate transport, packaging and/or storage of the umbrella base 10. For example, one or more of the lateral panels 142 may be rotatably coupled to the upper surface 144. In some embodiments, a lateral panel 142 can be detachably coupled to an adjacent lateral panel 142 through a releasable engagement device, including for example an engagement device comprising a hook and loop fastener (e.g., Velcro®). Other suitable releasable engagement devices may also be included. The rotatable coupling of the upper surface 144 to one or more of the lateral panels 142 and the releasable coupling of one lateral panel 142 to an adjacent lateral panel 142 may enable the foldable cover 140 to assume a lower-profile configuration, facilitating storage, packaging, and/or transport of the umbrella base 10. For example, the foldable cover 140 may be collapsed into a lower-profile configuration by rotating one or more lateral panels 142 along an edge adjacent to the upper surface 144 such that one or more lateral panels 142 is positioned below or above, and adjacent to the upper surface 144 (e.g., rotating one or more lateral panels 142 such that one or more lateral panels 142 is folded under or on top of, and adjacent to the upper surface 144).

In some embodiments, a lateral panel 142 may be configured to couple to another lateral panel 142 and/or the upper surface 144 along an adjacent edge such that the foldable cover 140 may be placeable over a foldable container (e.g., the foldable container 60 of FIG. 5). In some embodiments, the foldable cover 140, along with a surface upon which the foldable cover 140 is placed, can enclose a space at least as voluminous as that of the foldable container (e.g., the foldable container 60 of FIG. 5) over which the foldable cover 140 is placed such that the foldable cover 140 can contain or can substantially contain the foldable container.

In some embodiments, the foldable cover 140 is configured to couple to a foldable container (e.g., the foldable container 60 of FIG. 5), through for example one or more fastening devices 148. The one or more fastening devices 148 may comprise for example a hook and loop fastener (e.g., Velcro®). Other coupling devices may also be suitable. A portion of one or more of the fastening devices 148 may be positioned on an inside surface of a foldable cover lateral panel 142 and a corresponding portion of the one or more fastening devices (e.g., corresponding fastening device portion 74 of FIG. 5) may be positioned in a corresponding location on an outside surface of a foldable container lateral wall. For example, referring to FIG. 8, a portion of one or more fastening devices 148 may be placed at regular intervals along an edge of an inside surface of each foldable cover lateral panel 142. In some embodiments, a dimension and/or a number of the one or more fastening devices 148 can be optimized to enable a secure coupling between the foldable cover 140 and a foldable container.

In some embodiments, the foldable cover 140 having one or more lateral panels 142 and an upper surface 144 comprising rigid or substantially rigid material, and/or a secure coupling of the foldable cover 140 to a foldable container can enable the umbrella base to retain a shape, for example when the umbrella base is stepped on and/or kicked at by a user. For example, the umbrella base may be able to support an entire weight of an adult person such that the base may be able to retain or substantially retain the shape when the person stands upon the umbrella base.

Referring to FIG. 9, a cover 150 may comprise one or more lateral panels 152 and an upper surface 154 that includes one or more separable panels. For example, the upper surface 154 may comprise two separable panels 160 and 162 that can be coupled together to allow the cover 150 to be placed over an upright receptacle 24 for receiving an umbrella pole. In some embodiments, the separable panels 160, 162, may be coupled together so as to be flush with one another. In some embodiments, the separable panels 160 and 162 can be coupled together such that the upper surface 154 comprises an opening 156 for receiving an upright receptacle 24. The opening 156 may comprise various shapes, including for example a rectangular or substantially rectangular, or a circular or substantially circular shape. Other shapes may also be suitable. In some embodiments, the separable panels, 160, 162, can be dissembled into distinct pieces to facilitate packaging, storage and/or transport of the umbrella base 10.

The separable panels 160 and 162 may be releasably and/or rotatably coupled along an adjacent edge through a coupling device 170. In some embodiments, the coupling device 170 comprises an elongate channel 172 disposed along a planar side of a first panel (e.g. the separable panel 160) and a mating member 174 disposed along a planar side of a second panel (e.g. the separable panel 162), the mating member 174 and the elongate channel 172 permitting relative sliding of the separable panels (e.g. the separable panels 160, 162), but resisting or substantially resisting motion in a direction perpendicular to the longitudinal axis of the elongate channel 172. In some embodiments, the elongate channel 172 can be deflected to receive the mating member 174 by moving the mating member 174 toward the elongate channel 172. In some embodiments, the elongate channel 172 and mating member 174 are configured for sliding engagement.

In some embodiments, the upper surface 154 is releasably and/or rotatably coupled to one or more lateral panels 152. For example, the upper surface 154 may be releasably and/or rotatably coupled to a lateral panel 152 through a coupling device 180. In some embodiments, the coupling device 180 comprises features similar to those of coupling device 170. Referring to FIG. 9, in some embodiments, the coupling device 180 comprises an elongate channel 182 configured to couple to a mating member 184. For example, the coupling device 180 may comprise an elongate channel 182 disposed along a planar side of a first panel (e.g. the separable panel 160) and a mating member 184 disposed along a planar side of a second panel (e.g. a lateral panel 152) adjacent to the planar side of the first panel, the mating member 184 and the elongate channel 182 permitting relative sliding of the separable panel (e.g. the separable panel 160) and the lateral panel (e.g. a lateral panel 152), but resisting or substantially resisting motion in a direction perpendicular to the longitudinal axis of the elongate channel 182. In some embodiments, the elongate channel 182 can be deflected to receive the mating member 184 by moving the mating member 184 toward the elongate channel 182. In some embodiments, the elongate channel 182 and mating member 184 are configured for sliding engagement. In some embodiments, a lateral panel 152 and a separable panel (e.g. the separable panel 160) form a perpendicular or substantially perpendicular angle when coupled together by the coupling device 180.

Figure 10:
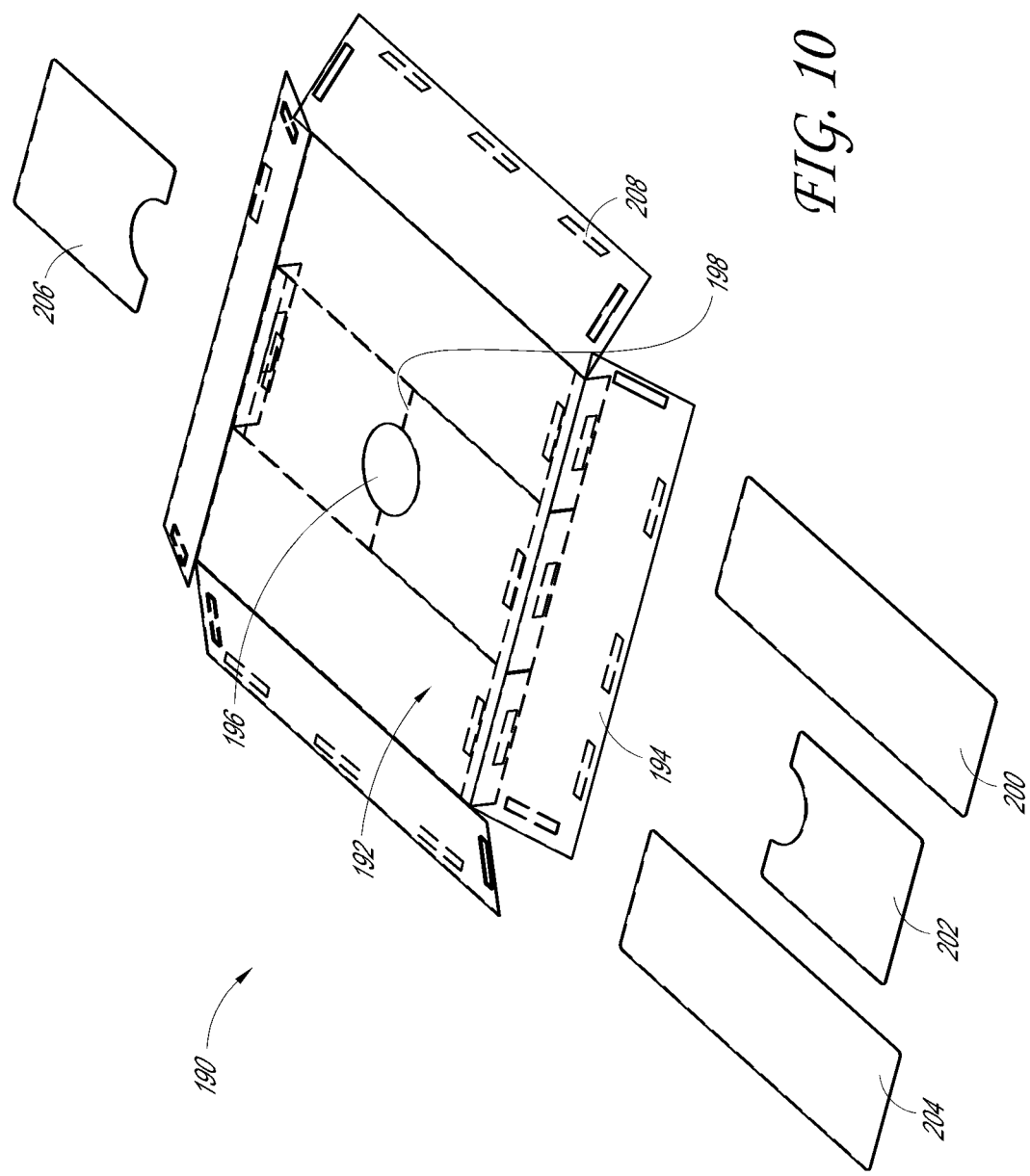
FIG. 10 shows an additional embodiment of an umbrella base cover.

Referring to FIG. 10, a cover 190 may comprise an upper surface 192 that is separable into two or more separate panels such that the separable panels may be pieced together to form the upper surface 192 and/or separated into distinct panels. The separable panels may enable a foldable cover 190 to facilitate transport, packaging, and/or storage of the umbrella base 10. In some embodiments, a foldable cover 190 comprising a rectangular shape includes an upper surface 192 comprising one or more separable panels that are releasably held together along one or more adjacent edges. For example, the upper surface 192 may comprise two or more separable panels, for example the separable panels 202 and 206, that can be pieced together to allow the foldable cover 190 to be placeable over an upright receptacle 24 for receiving an umbrella pole. The upper surface 192 may also comprise additional panels, for example the separable panels 200 and 204, placeable adjacent to separable panels 202 and 206. The separable panels 200, 202, 204, 206 may be coupled together through one or more engagement devices to form a flush or substantially flush upper surface 192. The foldable cover 190 may have one or more lateral panels 194. For example, one or more of the lateral panels 194 may be detachably and/or rotatably coupled to the upper surface 192, and/or detachably coupled to an adjacent lateral panel 194.

Alternatively, the foldable cover 190 may comprise a flexible material having one or more retainers configured to be coupled to one or more rigid or substantially rigid panels. The foldable cover 190 may comprise a woven fabric and/or a polymeric material having one or more retainers on an upper surface 192 and/or a lateral wall 208 configured to be coupled to one or more rigid or substantially rigid panels. For example, the material may comprise a canvas material (e.g., awning-grade canvas material). Other flexible materials may also be suitable for the foldable cover 190. The flexible material may enable at least a portion of the foldable cover 190 to be folded (e.g., rolled) such that the foldable cover 190 may assume a configuration having a reduced volume and/or footprint. The flexible material may enable the foldable cover 190 to conform to a shape of a storage and/or packaging container, for example to facilitate transport and/or storage.

As described herein, in some embodiments, the foldable cover 190 comprises a plurality of retainers configured to receive and hold a corresponding plurality of rigid members. For example, one or more of the retainers may comprise a pocket positioned on a surface of the foldable cover 190, the pocket configured for coupling to at least a portion of a corresponding rigid member. In some embodiments, the pocket extends along a surface of the foldable cover 190 and comprises an access opening along a side of the pocket. For example, the upper surface 192 may comprise a plurality of retainers configured to receive and hold a corresponding plurality of rigid members. For example, the separable panels 200, 202, 204, 206 may be configured to couple to one or more of the plurality of retainers to form at least in part the upper surface 192. In some embodiments, one or more of the separable panels 200, 202, 204, 206, are received and enclosed at least in part within one or more pockets positioned on the upper surface 192, including for example being entirely or substantially entirely enclosed within one or more corresponding pockets. In some embodiments, a lateral wall 208 of the foldable cover 190 comprises one or more retainers configured to receive one or more rigid members. For example, a lateral panel 194 may be coupled to a retainer positioned on a lateral wall 208. In some embodiments, a lateral wall 208 can be coupled to an adjacent lateral wall 208, for example through a hook and loop fastening device (e.g., Velcro®). Other coupling devices may also be suitable. In some embodiments, the foldable cover 190 can be coupled to a foldable container (e.g., the foldable container 60 of FIG. 7) through one or more fastening devices, as described herein.

A foldable cover 190 comprising flexible material having one or more retainers and one or more rigid members coupled to the one or more retainers may enable an umbrella base that can retain a shape, such as when the foldable cover 190 is placed over a foldable container (e.g., the foldable container 60 of FIG. 7). For example, the umbrella base having the foldable cover 190 may be able to retain a shape when being stepped on and/or kicked at by a user. In some embodiments, the umbrella base having the foldable cover 190 may be able to support an entire weight of an adult person such that the base may be able to retain or substantially retain the shape when the person stands upon the umbrella base.

In some embodiments, one or more of the retainers (e.g., one or more pockets) comprise a resealable engagement device positioned along an edge of the retainer, for example a hook and loop fastener (e.g. Velcro®). For example, a pocket configured to receive a rigid member (e.g., one or more of the separable panels 200, 202, 204, 206, and one or more lateral panels 194) may include a resealable engagement device along an opening of the pocket such that the rigid member can be securely retained.

An umbrella base 10 comprising a foldable container (e.g. the foldable container 60 of FIG. 7), a foldable cover (e.g. the foldable cover 190 of FIG. 10), and insertable members (e.g. the foldable container lateral insertable members 116 and/or the recess insertable members 124 of FIG. 7, and the rigid members 200, 202 204 206 of the foldable cover 190 in FIG. 10) configured to couple to retainers on one or more surfaces of the foldable container and/or foldable cover may enable a foldable umbrella base 10 that can be collapsible to a lower-profile configuration when not in use while enabling the foldable umbrella base 10 to retain a shape when the foldable umbrella base 10 is filled with the ballast material 18. A foldable container and a foldable cover may enable an umbrella base 10 having a reduced volume and/or footprint to facilitate packaging, storage, and/or transport of the base 10. An umbrella base 10 may also enable use of readily available ballast material 18 (e.g. sand, crushed rock, pebbles) to facilitate transport, storage and/or packaging of the umbrella base 10. For example, the umbrella base 10 may be transported without the ballast material 18 since suitable ballast material 18 may be readily available at a site where the umbrella base 10 is used, enabling transport, packaging and/or storage of the umbrella base 10 without the ballast material 18.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

The headings provided herein, if any, are for convenience only and do not necessarily affect the scope or meaning of the devices and methods disclosed herein.

What is claimed is:

1. A foldable umbrella base, comprising:
   a foldable container comprising a top edge, a bottom edge, and a peripheral surface, the peripheral surface being bounded by the top edge and the bottom edge of the foldable container, the foldable container being configured to be placed on a ground surface;
   wherein the foldable container further comprises a central portion and a bottom surface, the central portion comprising a sleeve extending from the bottom surface toward the top edge and the sleeve surrounding a space extending at least partially through the foldable container;
   wherein the foldable container comprises a ballast retaining space partially formed by the bottom surface, the peripheral surface and the sleeve;
   wherein the space surrounded by the sleeve is isolated from the ballast retaining space by a continuous outer surface of the sleeve extending from the bottom surface to a height corresponding to the top edge of the peripheral surface, the continuous outer surface of the sleeve comprising a woven fabric and configured to prevent a ballast material comprising sand from flowing into the space surrounded by the sleeve from the ballast retaining space;
   a plurality of elongate pockets positioned on and aligned with the peripheral surface of the foldable container; and
   a plurality of rigid members, one of an upper or a lower end of each of said rigid members retained in a corresponding elongate pocket of the plurality of elongate pockets between the top and bottom edges of the container;
   whereby the foldable container can retain a shape upon receiving a ballast material.

2. The foldable umbrella base of claim 1, further comprising a base piece, wherein the base piece comprises a cross-piece, the foldable container being configured to be placed over at least a portion of the base piece.

3. The foldable umbrella base of claim 1, wherein each of the pockets is positioned along a length of the peripheral surface.

4. The foldable umbrella base of claim 1 further comprising a foldable cover configured to be placed over the foldable container, wherein the foldable cover comprises separable panels configured to be coupled together through one or more engagement devices to form a flush upper surface.

5. The foldable umbrella base of claim 1, further comprising a cover configured to be placed over the foldable container, the cover having an aperture such that an upright receptacle of a base piece is permitted to extend through the cover.

6. The foldable umbrella base of claim 1, wherein each of the pockets has a sealed bottom portion, and wherein the rigid members configured to be retained in the pockets have a top edge and a bottom edge, such that when the rigid members are coupled with the pockets, the bottom edge of the rigid members are disposed above the sealed bottom portion of the pocket.

7. The foldable umbrella base of claim 1, wherein each of the pockets comprise an open end adjacent to two closed edges, the open end disposed opposite a closed end, and the two closed edges disposed between the top and bottom edges of the foldable container, whereby a planar space is formed within the pockets, each of the rigid members comprising a planar panel configured to be received in the planar space.

8. The foldable umbrella base of claim 1, wherein the foldable container is configured to be placed over at least a portion of a base piece having an upright receptacle for receiving an umbrella pole such that the upright receptacle is permitted to extend through the sleeve of the foldable container, and wherein the foldable container further comprises a plurality of discrete elongate supports coupled to the sleeve and extending radially therefrom toward the peripheral surface of the foldable container.

9. The foldable umbrella base of claim 8, wherein each of the plurality of discrete elongate supports comprises a vertical surface extending from the bottom edge of the foldable container, and wherein the foldable umbrella base further comprises a plurality of rigid members for coupling with the vertical surface of each of the plurality of discrete elongate supports.

10. The foldable umbrella base of claim 1, wherein each of the plurality of elongate pockets comprise a shape substantially the same as the peripheral surface of the foldable container, and each of the plurality of rigid members comprises a shape substantially the same as the peripheral surface of the foldable container.

11. The foldable umbrella base of claim 1, wherein each of the elongate pockets comprises an access opening, and wherein the foldable container further comprises a closure device disposable over each of the access openings such that each of the plurality of the rigid members is received and retained within the corresponding elongate pocket.

12. The foldable umbrella base of claim 1, wherein the woven fabric comprises a canvas material.

13. A foldable umbrella base, comprising:
   a foldable container comprising a lateral periphery, a central portion, a bottom surface, and a top surface, the central portion fixedly connected to the bottom surface and comprising a sleeve extending along a portion of the foldable container between the bottom surface and the top surface, the foldable container comprising a ballast retaining space configured to receive and retain a ballast material in a volume bounded by the sleeve of the central portion, the lateral periphery, and the bottom surface, the ballast material being prevented by the sleeve from passing from the ballast retaining space to an interior of the sleeve;
   the lateral periphery comprising a plurality of pockets configured to receive and hold a corresponding plurality of rigid members, at least one of said plurality of pockets having an access opening disposed on the lateral periphery of the container; and a plurality of elongate supports having a first end connected to the central portion and a second end connected to the lateral periphery above the bottom surface;
wherein the corresponding plurality of rigid members and the elongate supports are configured to provide structural support to the lateral periphery and the central portion comprising the sleeve, whereby the container can retain a shape upon receiving the ballast
wherein the foldable container is configured to be placed over at least a portion of a base piece having an upright receptacle for receiving an umbrella pole such that the upright receptacle is permitted to extend through the sleeve.

14. The foldable umbrella base of claim 13, further comprising a cover configured to be disposed over the foldable container to enclose the foldable container and a cross-piece and to permit the umbrella pole to extend therethrough.

15. The foldable umbrella base of claim 14, further comprising a device to join the cover to the foldable container.

16. The foldable umbrella base of claim 14, wherein the cover is foldable, the foldable cover including a plurality of retainers configured to receive and hold a corresponding plurality of rigid members, at least one of said retainers comprising a pocket having an access opening and extending along a surface of the cover.

17. The foldable umbrella base of claim 14, wherein the cover comprises a plurality of segments adapted to be joined to enclose a space.

18. The foldable umbrella base of claim 14, wherein the cover comprises a plurality of separable panels configured to be pieced together to form an upper surface of the cover, the separable panels being releasably held together along one or more adjacent edges.

19. The foldable umbrella base of claim 13, wherein each of the plurality of elongate supports further comprise a top edge, a bottom edge and a vertical surface extending between the bottom edge and the top edge, and wherein the foldable umbrella base further comprises a plurality of rigid members for coupling with the vertical surface of each of the plurality of elongate supports.

20. The foldable umbrella base of claim 19, wherein the vertical surface of each of the plurality of elongate supports forms a sidewall of a corresponding recessed zone on the bottom surface of the foldable umbrella base, and wherein each corresponding recessed zone is configured for placement over a cross-piece portion of a base piece.

21. The foldable umbrella base of claim 13, wherein the lateral periphery of the foldable container comprises four lateral surfaces, wherein each of the lateral surfaces comprises a pocket of the plurality of pockets, and wherein each of the plurality of pockets is configured to receive a rectangular rigid member, whereby the foldable container maintains a rectangular shape upon receiving the ballast.

22. The foldable umbrella base of claim 13, wherein the sleeve comprises at least one retainer configured to receive a rigid member to provide structural support to the sleeve, whereby the sleeve can retain a shape upon the ballast being received in the ballast receiving space.

23. The foldable umbrella base of claim 22, wherein the sleeve comprises a plurality of pockets configured to receive a corresponding plurality of rigid members.

24. The foldable umbrella base of claim 14, wherein the cover rigidly encloses, in combination with a surface upon which the cover is placed, a space at least as voluminous as the foldable container, the cover being collapsible by decoupling an engagement device disposed between two adjacent panels thereof.

25. The foldable umbrella base of claim 24, wherein the engagement device comprises an elongate channel disposed along a planar side of a first panel and a mating member disposed along a planar side of a second panel, the mating member and the elongate channel permitting relative sliding of the panels, but resisting motion perpendicular to the longitudinal axis of the elongate channel.

26. The foldable umbrella base of claim 25, wherein the elongate channel can be deflected to receive the mating member by moving the mating member toward the elongate channel.

27. The foldable umbrella base of claim 25, wherein the elongate channel and mating member are configured for sliding engagement.

28. The foldable umbrella base of claim 13, wherein the foldable container further comprises a resealable access opening configured to allow insertion or removal of the ballast material into or out of the ballast retaining space.

29. The foldable umbrella base of claim 28, wherein the resealable access opening comprises a zipper.

30. A foldable umbrella base, comprising:
a foldable container comprising a top edge, a bottom edge, and a peripheral surface, the peripheral surface being bounded by the top edge and the bottom edge of the foldable container, the foldable container being configured to be placed on a ground surface,
wherein the foldable container further comprises a central portion and a bottom surface, the central portion comprising a sleeve extending from the bottom surface toward the top edge and the sleeve surrounding a space extending at least partially through the foldable container, and
wherein the foldable container comprises a ballast retaining space bounded by the bottom surface, the peripheral surface and the sleeve, the space surrounded by the sleeve being isolated from the ballast retaining space such that ballast is prevented from passing from the ballast retaining space into the space surrounded by an imperforate outer surface of the sleeve extending upwards from the bottom surface to the top edge, the imperforate outer surface of the sleeve comprising a polymeric material;
a plurality of elongate pockets positioned on and aligned with the peripheral surface of the foldable container;
a plurality of rigid members, one of an upper or a lower end of each of said plurality of rigid members retained in a corresponding elongate pocket between the top and bottom edges of the foldable container;
whereby the foldable container can retain a shape upon receiving a ballast material, and
wherein the foldable container is configured to be placed over at least a portion of a base piece having an upright receptacle for receiving an umbrella pole such that the upright receptacle is permitted to extend through the sleeve of the foldable container, and wherein the foldable container further comprises a plurality of elongate supports coupled to the sleeve and extending radially therefrom toward the peripheral surface of the foldable container.

* * * * *